US012657099B2

(12) United States Patent (10) Patent No.: US 12,657,099 B2
Canos (45) Date of Patent: Jun. 16, 2026

(54) ARTIFICIAL INTELLIGENCE FOR MONITORING A PORTABLE ELECTRONIC DEVICE TESTING ARRANGEMENT

(71) Applicant: T-Mobile USA, Inc., Bellevue, WA (US)

(72) Inventor: Paul Lunaria Canos, Bothell, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 25 days.

(21) Appl. No.: 18/678,920

(22) Filed: May 30, 2024

(65) Prior Publication Data

US 2025/0370890 A1 Dec. 4, 2025

(51) Int. Cl.
*G06F 11/22* (2006.01)
*G06F 9/455* (2018.01)

(52) U.S. Cl.
CPC ...... *G06F 11/2273* (2013.01); *G06F 9/45533* (2013.01); *G06F 2201/815* (2013.01)

(58) Field of Classification Search
CPC ............. G06F 11/2273; G06F 9/45533; G06F 2201/815
USPC .......................................................... 714/33
See application file for complete search history.

(56) References Cited

U.S. PATENT DOCUMENTS

| | | | |
|---|---|---|---|
| 2012/0072774 A1* | 3/2012 | Spinner | G06F 11/263 |
| | | | 714/E11.159 |
| 2017/0109270 A1* | 4/2017 | Ekambaram | H04W 12/08 |
| 2019/0278699 A1* | 9/2019 | Sharma | G06F 9/451 |

OTHER PUBLICATIONS

Wikipedia "machine learning" page, retrieved from https://en.wikipedia.org/wiki/Machine_learning (Year: 2025).*
Wikipedia "Automatic test equipment" page, retrieved from https://en.wikipedia.org/wiki/Automatic_test_equipment (Year: 2025).*

* cited by examiner

*Primary Examiner* — Yair Leibovich
(74) *Attorney, Agent, or Firm* — Lee & Hayes, P.C.

(57) ABSTRACT

An automated method comprises determining, via a machine learning (ML) model, a list of virtual devices used for an automated testing arrangement for portable electronic devices, wherein the virtual devices correspond to registered portable electronic devices. The automated method also comprises testing, via the testing arrangement, one or more first portable electronic devices. The automated method further comprises, during the testing, monitoring, via the ML model, the automated testing arrangement for the portable electronic devices to obtain information. The automated method also comprises comparing, via the ML model, the information with the list of virtual devices and based at least in part on the comparing, determining issues with virtual devices used for the automated testing arrangement.

20 Claims, 3 Drawing Sheets

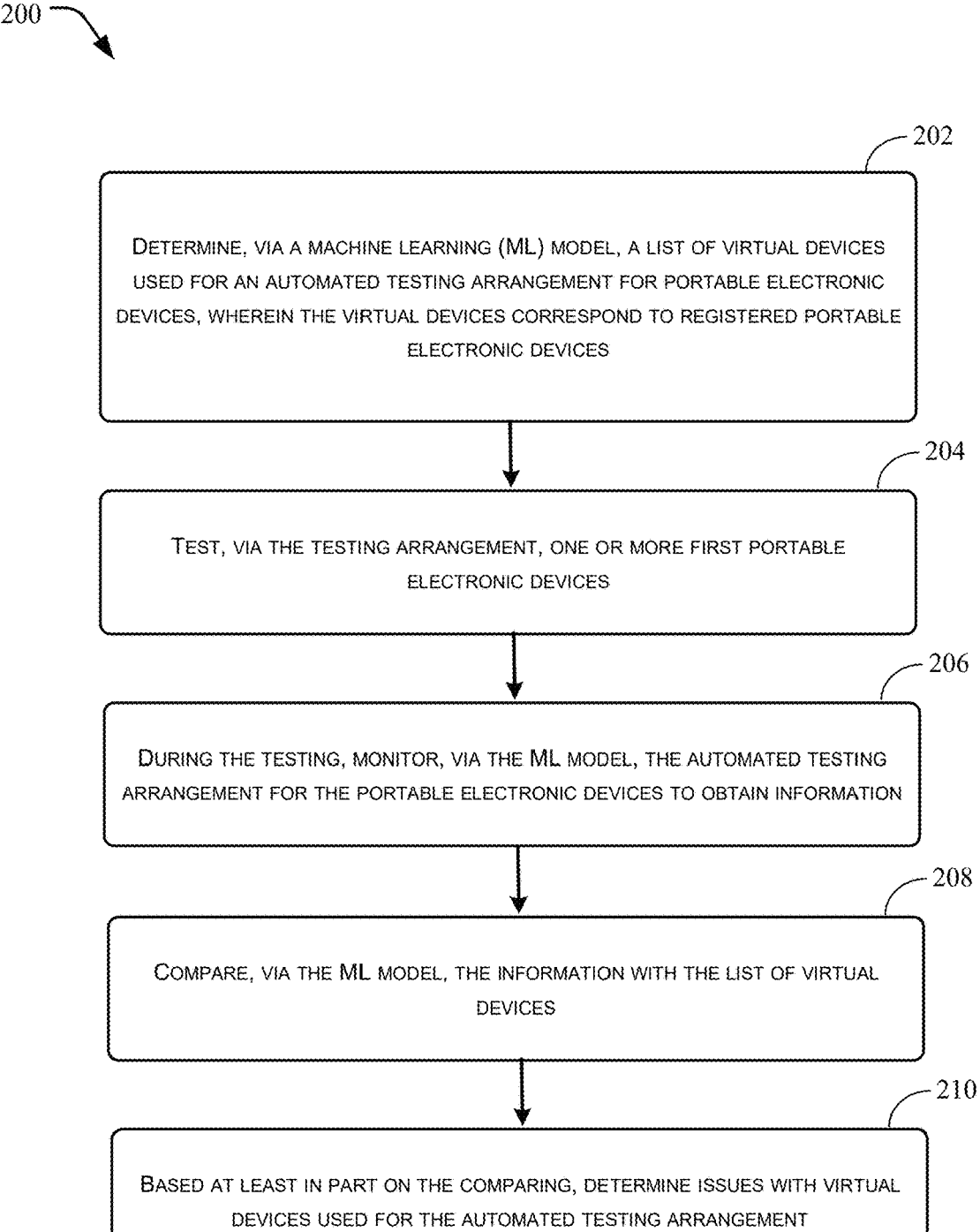

200

202

DETERMINE, VIA A MACHINE LEARNING (ML) MODEL, A LIST OF VIRTUAL DEVICES USED FOR AN AUTOMATED TESTING ARRANGEMENT FOR PORTABLE ELECTRONIC DEVICES, WHEREIN THE VIRTUAL DEVICES CORRESPOND TO REGISTERED PORTABLE ELECTRONIC DEVICES

204

TEST, VIA THE TESTING ARRANGEMENT, ONE OR MORE FIRST PORTABLE ELECTRONIC DEVICES

206

DURING THE TESTING, MONITOR, VIA THE ML MODEL, THE AUTOMATED TESTING ARRANGEMENT FOR THE PORTABLE ELECTRONIC DEVICES TO OBTAIN INFORMATION

208

COMPARE, VIA THE ML MODEL, THE INFORMATION WITH THE LIST OF VIRTUAL DEVICES

210

BASED AT LEAST IN PART ON THE COMPARING, DETERMINE ISSUES WITH VIRTUAL DEVICES USED FOR THE AUTOMATED TESTING ARRANGEMENT

FIG. 2

ELECTRONIC DEVICE 300

MEMORY 302

APPLICATION(S)
304

SETTINGS MODULE 306

OPERATING SYSTEM
308

PROCESSOR(S)
312

REMOVABLE
STORAGE 314

NON-REMOVABLE
STORAGE 316

CACHE
318

TRANSCEIVERS
320

OUTPUT DEVICES
322

INPUT DEVICES 324

ARTIFICIAL INTELLIGENCE FOR MONITORING A PORTABLE ELECTRONIC DEVICE TESTING ARRANGEMENT

BACKGROUND

Wireless communication networks provide services to many users. The users access the services of the wireless communication network via various types of electronic devices. The most common type of electronic device is a portable electronic device that is generally mobile. During lab testing of the electronic devices, issues may be encountered on either the wireless communication network or a virtual device setup used during the testing. In order to figure out if the issue is related to the wireless communication network or the virtual device used in the virtual device setup, a large amount of time may be wasted. Examples of issues may include that the virtual device is old or obsolete and it is difficult to determine if the corresponding physical electronic device is actually still in use in the wireless communication network. Additionally, issues may arise related to the virtual device not being registered with respect to a testing container that includes physical electronic devices corresponding to the virtual device. Also, the physical electronic devices may not be available to use for testing, e.g., they are not available to be placed in the testing container. Thus, it is necessary to figure out which electronic devices are actually available for testing at that time. Furthermore, issues may arise with respect to determining if physical electronic devices are to be used for manual testing or for automated testing within the testing arrangement, e.g., automated testing by placing the physical electronic devices within the testing container for testing.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 2 is a flow diagram illustrating an example method associated with testing physical portable electronic devices using an automated testing arrangement that includes a machine learning model, according to some implementations.

DETAILED DESCRIPTION

Figure 1:
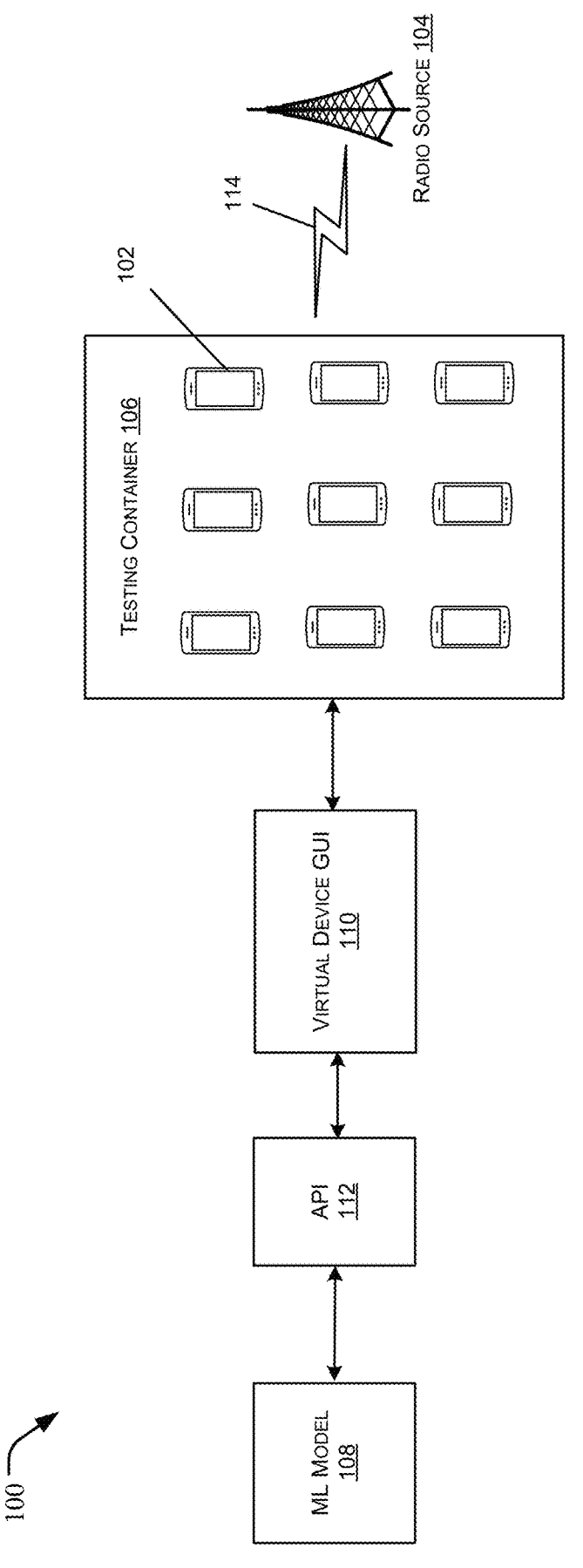
FIG. 1 is an example of an automated testing arrangement for portable electronic devices that includes a machine learning model, according to some implementations.

Described herein are techniques and architecture related to monitoring an automated electronic device testing arrangement utilizing a machine learning (ML) model. The ML model may be utilized to obtain a list of physical electronic devices that are utilized within a wireless communication network. The ML model may compare information related to testing of electronic devices in the automated testing network arrangement. In configurations, an alert may be generated by the ML model to cause removal of old or obsolete portable electronic devices from the list that are no longer used in the wireless communication network. Thus, use of the ML model may allow for quickly using available devices for testing and eliminating other physical electronic devices that are old or obsolete and not working or operating within the wireless communication network. Additionally, the ML model may save time by not troubleshooting obsolete and/or inoperative virtual devices used in the testing arrangement. The ML model may be utilized to determine or check and use available physical portable electronic devices for testing. The ML model may additionally identify physical portable electronic devices that are assigned for use in the automated testing arrangement versus those physical portable electronic devices that are for use in manual testing. The ML model may also provide a needed inventory of devices between IOS and Android portable electronic devices for issue replication.

As an example, in configurations, the ML model may comprise a deep learning model. The deep learning model may comprise an architecture related to a recurrent neural network, for example, a long short-term memory (LSTM) neural network. LSTM is an artificial recurrent neural network (RNN) architecture used in the field of deep learning. Unlike standard feedforward neural networks, LSTM has feedback connections. It can not only process single data points (such as images), but also entire sequences of data. Another example architecture for the deep learning model includes using random cut forest (RCF), which is an unsupervised algorithm. Other architectures and algorithms may be used for the ML model if desired.

Wireless communication networks provide services to many users. The users access the services of the wireless communication network via various types of electronic devices. The most common type of electronic device is a portable electronic device that is generally mobile. Examples of portable electronic devices include, but are not limited to, smartphones, tablets, laptop computers, etc.

The electronic devices generally utilize applications (Apps) that often require access to a wireless communication network for proper functioning. Operators of wireless communication networks test electronic devices to help ensure that the electronic devices functionality is good within a wireless communication network. Operators of wireless communication networks may test the electronic devices hardware and/or software, e.g., Apps, firmware, etc. The operators often test the electronic devices in a lab using a testing arrangement.

A common testing arrangement includes a virtual device graphic user interface (GUI) that interacts with an apparatus that includes actual electronic devices therein. The devices receive radio frequency (RF) signals from a radio source. The virtual device GUI interacts with the portable electronic devices within the container to conduct various tests while the portable electronic devices are interacting with the RF signals from the radio source. Generally, the virtual device for the virtual device GUI corresponds to the physical devices within the container.

In configurations, a virtual device may be selected to use for testing with respect to physical portable electronic devices. The selected virtual device corresponds to the physical portable electronic devices and includes a graphical user interface (GUI). The virtual device GUI interacts with a testing container that includes the physical portable electronic devices corresponding to the virtual device. The physical portable electronic devices are to be tested with respect to their software, Apps, firmware, hardware, etc. for operation on a wireless communication network. Thus, during testing the physical portable electronic devices receive radio frequency (RF) signals from a radio source within the testing container. The virtual device interacts with the physical portable electronic devices within the container in order to conduct various tests via the GUI.

In configurations, a machine learning (ML) model interacts with the virtual device GUI in order to monitor the testing arrangement during the testing. Thus, the ML model obtains various pieces of information via the GUI related to the tests, the physical portable electronic devices, the virtual device, the wireless communication network, etc.

The ML model may maintain a list of valid virtual devices. Thus, when an issue arises during testing, the ML model may quickly determine that the virtual device is old or obsolete, e.g., the corresponding physical portable electronic devices are no longer used in the wireless communication network. In configurations, the ML model may provide an alert to a user of the testing arrangement that the virtual device is old or obsolete and corresponds to the physical portable electronic devices that are no longer available and/or used in the wireless communication network. Such an alert may be audible, visual, or both.

Additionally, the ML model may determine, when an issue arises, that certain physical portable electronic devices are designated for use in the testing container, e.g., in the testing arrangement. Additionally, when an issue arises, the ML model may determine that one or more of the physical portable electronic devices within the container are not registered with the testing container. In configurations, the ML model may determine that certain physical portable electronic devices are available for including in the physical portable electronic devices for testing within the container of the testing arrangement. Additionally, the ML model may determine additional virtual devices that are available for selection to use for testing of physical portable electronic devices within the testing container. These additional virtual devices may be included in the list of virtual devices maintained by the ML model. Thus, when certain physical portable electronic devices are to be tested, the list now includes additional virtual devices and associated GUIs for the testing.

Accordingly, as an example, the techniques and architecture provide an automated method that comprises determining, via a machine learning (ML) model, a list of virtual devices used for an automated testing arrangement for portable electronic devices, wherein the virtual devices correspond to registered portable electronic devices. The automated method also comprises testing, via the testing arrangement, one or more first portable electronic devices. The automated method further comprises, during the testing, monitoring, via the ML model, the automated testing arrangement for the portable electronic devices to obtain information. The automated method also comprises comparing, via the ML model, the information with the list of virtual devices and based at least in part on the comparing, determining issues with virtual devices used for the automated testing arrangement.

In configurations, the determining issues with virtual devices used for the automated testing arrangement comprises determining one or more virtual devices that are out of market.

In configurations, the automated method further comprises providing, via the ML model, an alert to a user of the testing arrangement that one or more virtual devices that are out of market.

In configurations, the determining issues with virtual devices used for the automated testing arrangement comprises determining one or more second portable electronic devices are designated for use in the testing arrangement.

In configurations, the determining issues with virtual devices used for the automated testing arrangement comprises determining one or more of the one or more first portable electronic devices are not a registered portable electronic device.

In configurations, the automated method further comprises determining, via the ML model, portable electronic devices available for including in the one or more first portable electronic devices.

In configurations, the automated method further comprises determining, via the ML model, additional virtual devices available for inclusion on the list of virtual devices.

In configurations, the one or more portable electronic devices comprise one of a smartphone, a tablet, or a laptop computer.

As another example, the techniques and architecture provide one or more non-transitory media comprising instructions stored thereon, the instructions being executable by one or more processors to cause the one or more processors to perform one or more actions. The actions comprise determining, via a machine learning (ML) model, a list of virtual devices used for an automated testing arrangement for portable electronic devices, wherein the virtual devices correspond to registered portable electronic devices. The actions also comprise testing, via the testing arrangement, one or more first portable electronic devices. The actions further comprise, during the testing, monitoring, via the ML model, the automated testing arrangement for the portable electronic devices to obtain information. The actions also comprise comparing, via the ML model, the information with the list of virtual devices and based at least in part on the comparing, determining issues with virtual devices used for the automated testing arrangement.

As a further example, the techniques and architecture provide a testing arrangement for portable electronic devices, where the testing arrangement comprises one or more processors and one or more non-transitory media comprising instructions stored thereon, the instructions being executable by the one or more processors to cause the one or more processors to perform one or more actions. The actions comprise determining, via a machine learning (ML) model, a list of virtual devices used for an automated testing arrangement for portable electronic devices, wherein the virtual devices correspond to registered portable electronic devices. The actions also comprise testing, via the testing arrangement, one or more first portable electronic devices. The actions further comprise, during the testing, monitoring, via the ML model, the automated testing arrangement for the portable electronic devices to obtain information. The actions also comprise comparing, via the ML model, the information with the list of virtual devices and based at least in part on the comparing, determining issues with virtual devices used for the automated testing arrangement.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 schematically illustrate an example automated testing arrangement 100 for portable electronic devices 102 that may be configured for use with a radio source 104. In configurations, the radio source 104 may be part of a wireless communication network. The automated testing arrangement 100 includes a testing container 106 in which portable electronic devices 102 may be placed for testing.

A machine learning (ML) model 108 may be utilized monitor the automated testing arrangement 100. The ML model 108 may be implemented in some type of computing device (not shown). For example, the ML model 108 may obtain a list of physical portable electronic devices 102 that are utilized within a wireless communication network. The ML model 108 may compare information related to testing of portable electronic devices 102 in the automated testing arrangement 100. In configurations, an alert may be generated by the ML model 108 to cause removal of old or obsolete portable electronic devices 102 from the list that are no longer used in the wireless communication network. Thus, use of the ML model 108 may allow for quickly using available physical portable electronic devices 102 for testing and eliminating other physical portable electronic devices 102 that are old or obsolete and not working or operating within the wireless communication network.

A virtual device graphical user interface (GUI) 110 may be accessed by the ML model 108 via an application programming interface (API) 112. The virtual device GUI 110 is part of a virtual device (e.g., a virtual representation) that corresponds to physical portable electronic devices 102 being tested in the testing container 106. The ML model 108 may save time by not troubleshooting obsolete and/or inoperative virtual devices discovered in the information obtained by the ML model 108 during testing. The ML model 108 may be utilized to determine or check and use available physical portable electronic devices 102 for testing. The ML model 108 may additionally identify physical portable electronic devices 102 that are assigned for use in the automated testing arrangement 100 versus those physical portable electronic devices 102 that are for use in manual testing. The ML model 108 may also provide a needed inventory of devices between IOS and Android portable electronic devices for issue replication.

As an example, in configurations, the ML model 108 may comprise a deep learning model. The deep learning model may comprise an architecture related to a recurrent neural network, for example, a long short-term memory (LSTM) neural network. LSTM is an artificial recurrent neural network (RNN) architecture used in the field of deep learning. Unlike standard feedforward neural networks, LSTM has feedback connections. It can not only process single data points (such as images), but also entire sequences of data. Another example architecture for the deep learning model includes using random cut forest (RCF), which is an unsupervised algorithm. Other architectures and algorithms may be used for the ML model 108 if desired.

As previously noted, wireless communication networks provide services to many users. The users access the services of the wireless communication network via various types of electronic devices. The most common type of electronic device is a portable electronic device that is generally mobile. Examples of portable electronic devices include, but are not limited to, smartphones, tablets, laptop computers, etc.

The electronic devices generally utilize applications (Apps) that often require access to a wireless communication network for proper functioning. Operators of wireless communication networks test electronic devices to help ensure that the electronic devices functionality is good within a wireless communication network. Operators of wireless communication networks may test the electronic devices hardware and/or software, e.g., Apps, firmware, etc. The operators often test the electronic devices in a lab using a testing arrangement, e.g., the automated testing arrangement 100.

A common automated testing arrangement includes the virtual device GUI 110 that interacts with testing container 106 that includes actual, physical portable electronic devices 102 therein. The physical portable electronic devices 102 receive radio frequency (RF) signals (feeds) 114 from the radio source 104. The virtual device GUI 110 interacts with the physical portable electronic devices 102 within the testing container 106 to conduct various tests while the physical portable electronic devices 102 are interacting with the RF signals 114 from the radio source 104. Generally, the virtual device for the virtual device GUI 110 corresponds to the physical portable electronic devices 102 within the testing container 106.

In configurations, a virtual device may be selected to use for testing with respect to the physical portable electronic devices 102. The selected virtual device corresponds to the physical portable electronic devices and includes the GUI 110. The virtual device GUI 110 interacts with the testing container 106 that includes the physical portable electronic devices 102 corresponding to the virtual device. The physical portable electronic devices 102 are to be tested with respect to their software, Apps, firmware, hardware, etc. for operation on the wireless communication network. Thus, during testing the physical portable electronic devices 102 are connected to the wireless communication network such that they receive the RF signals 114 within the testing container 106. The virtual device interacts with the physical portable electronic devices 102 within the testing container 106 in order to conduct various tests via the GUI 110.

In configurations, the ML model 108 interacts with the virtual device GUI 110 in order to monitor the testing arrangement during the testing. Thus, the ML model 108 obtains various pieces of information via the GUI 110 related to the tests, the physical portable electronic devices, the virtual device, the wireless communication network, etc.

The ML model 108 may maintain a list of valid virtual devices. Thus, when an issue arises during testing, the ML model 108 may quickly determine that the virtual device is old or obsolete, e.g., the corresponding physical portable electronic devices 102 are no longer used in the wireless communication network. In configurations, the ML model 108 may provide an alert to a user of the automated testing arrangement 100 that the virtual device is old or obsolete and corresponds to physical portable electronic devices 102 that are no longer available and/or used in the wireless communication network (e.g., out of market). Such an alert may be audible, visual, or both.

Additionally, the ML model 108 may determine, when an issue arises, that certain physical portable electronic devices 102 are designated for use in the testing container 106, e.g., in the automated testing arrangement 100. Additionally, when an issue arises, the ML model 108 may determine that one or more of the physical portable electronic devices 102 within the testing container 106 are not registered with the testing container 106. In configurations, the ML model 108 may determine that certain physical portable electronic devices are available for including in the physical portable electronic devices 102 for testing within the testing container 106 of the automated testing arrangement 100. Additionally, the ML model 108 may determine additional virtual devices that are available for selection to use for testing of physical portable electronic devices 102 within the testing container 106. These additional virtual devices may be included in the list of virtual devices maintained by the ML model 108. Thus, when certain physical portable electronic devices 102 are to be tested, the list now includes additional virtual devices and associated GUIs 110 for the testing.

FIG. 2 is a flow diagram illustrating example processes associated with the automated testing arrangement discussed herein. The process is illustrated as a collection of blocks in a logical flow diagram, which represent a sequence of operations, some or all of which can be implemented in hardware, software, or a combination thereof. In the context of software, the blocks represent computer-executable instructions stored on one or more computer-readable media that, when executed by one or more processor(s), performs the recited operations. Generally, computer-executable instructions include routines, programs, objects, components, encryption, deciphering, compressing, recording, data structures and the like that perform particular functions or implement particular abstract data types.

The order in which the operations are described should not be construed as a limitation. Any number of the described blocks can be combined in any order and/or in parallel to implement the processes, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

FIG. 2 is a flow diagram illustrating an example method 200 associated with testing physical portable electronic devices, e.g., physical portable electronic devices 102, using an automated testing arrangement, e.g., automated testing arrangement 100, that includes a machine learning model, e.g., ML model 108, according to some implementations.

At 202, a machine learning (ML) model determines a list of virtual devices used for an automated testing arrangement for portable electronic devices, wherein the virtual devices correspond to registered portable electronic devices. For example, the ML model 108 may obtain a list of physical portable electronic devices 102 that are utilized within the wireless communication network.

At 204, the testing arrangement tests one or more first portable electronic devices. For example, a common automated testing arrangement includes the virtual device GUI 110 that interacts with testing container 106 that includes actual, physical portable electronic devices 102 therein. The physical portable electronic devices 102 receive radio frequency (RF) signals (feeds) 114 from the radio source 104. The virtual device GUI 110 interacts with the physical portable electronic devices 102 within the testing container 106 to conduct various tests while the physical portable electronic devices 102 are interacting with the RF signals 114 from the radio source 104. Generally, the virtual device for the virtual device GUI 110 corresponds to the physical portable electronic devices 102 within the testing container 106.

At 206, during the testing, the ML model monitors the automated testing arrangement for the portable electronic devices to obtain information. For example, the ML model 108 interacts with the virtual device GUI 110 in order to monitor the testing arrangement during the testing. Thus, the ML model 108 obtains various pieces of information via the GUI 110 related to the tests, the physical portable electronic devices, the virtual device, the wireless communication network, etc.

At 208, the ML model compares the information with the list of virtual devices. For example, The ML model 108 may compare information related to testing of portable electronic devices 102 in the automated testing arrangement 100. In configurations, an alert may be generated by the ML model 108 to cause removal of old or obsolete portable electronic devices 102 from the list that are no longer used in the wireless communication network. Thus, use of the ML model 108 may allow for quickly using available physical portable electronic devices 102 for testing and eliminating other physical portable electronic devices 102 that are old or obsolete and not working or operating within the wireless communication network.

At 210, based at least in part on the comparing, issues with virtual devices used for the automated testing arrangement are determined. For example, when an issue arises during testing, the ML model 108 may quickly determine that the virtual device is old or obsolete, e.g., the corresponding physical portable electronic devices 102 are no longer used in the wireless communication network. In configurations, the ML model 108 may provide an alert to a user of the automated testing arrangement 100 that the virtual device is old or obsolete and corresponds to physical portable electronic devices 102 that are no longer available and/or used in the wireless communication network. Such an alert may be audible, visual, or both.

Additionally, the ML model 108 may determine, when an issue arises, that certain physical portable electronic devices 102 are designated for use in the testing container 106, e.g., in the automated testing arrangement 100. Additionally, when an issue arises, the ML model 108 may determine that one or more of the physical portable electronic devices 102 within the testing container 106 are not registered with the testing container 106. In configurations, the ML model 108 may determine that certain physical portable electronic devices are available for including in the physical portable electronic devices 102 for testing within the testing container 106 of the automated testing arrangement 100. Additionally, the ML model 108 may determine additional virtual devices that are available for selection to use for testing of physical portable electronic devices 102 within the testing container 106. These additional virtual devices may be included in the list of virtual devices maintained by the ML model 108. Thus, when certain physical portable electronic devices 102 are to be tested, the list now includes additional virtual devices and associated GUIs 110 for the testing.

Portable electronic devices 102 may be implemented as any suitable mobile computing device configured to communicate over a wireless and/or wireline network, including, without limitation, a mobile phone (e.g., a smart phone), a tablet computer, a laptop computer, a portable digital assistant (PDA), a wearable computer (e.g., electronic/smart glasses, a smart watch, fitness trackers, etc.), a networked digital camera, and/or similar mobile devices. Although this description predominantly describes the portable electronic devices 102 as being "mobile" (i.e., configured to be carried and moved around), it is to be appreciated that the portable electronic devices 102 may represent various types of communication devices that are generally stationary as well, such as televisions, desktop computers, game consoles, set top boxes, Internet of Things (IoT) devices, and the like. In this sense, the terms "communication device," "wireless device," "wireline device," "mobile device," "computing device," "portable electronic device," and "user equipment (UE)" may be used interchangeably herein to describe any communication device capable of performing the techniques described herein. Furthermore, the portable electronic devices 102 may be capable of communicating over wired networks, and/or wirelessly using any suitable wireless communications/data technology, protocol, or standard, such as Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VOIP), Voice over LTE (VOLTE), 5G, IEEE 802.1x protocols, WiMAX, Wi-Fi, and/or any future IP-based network technology or evolution of an existing IP-based network technology.

Figure 3:
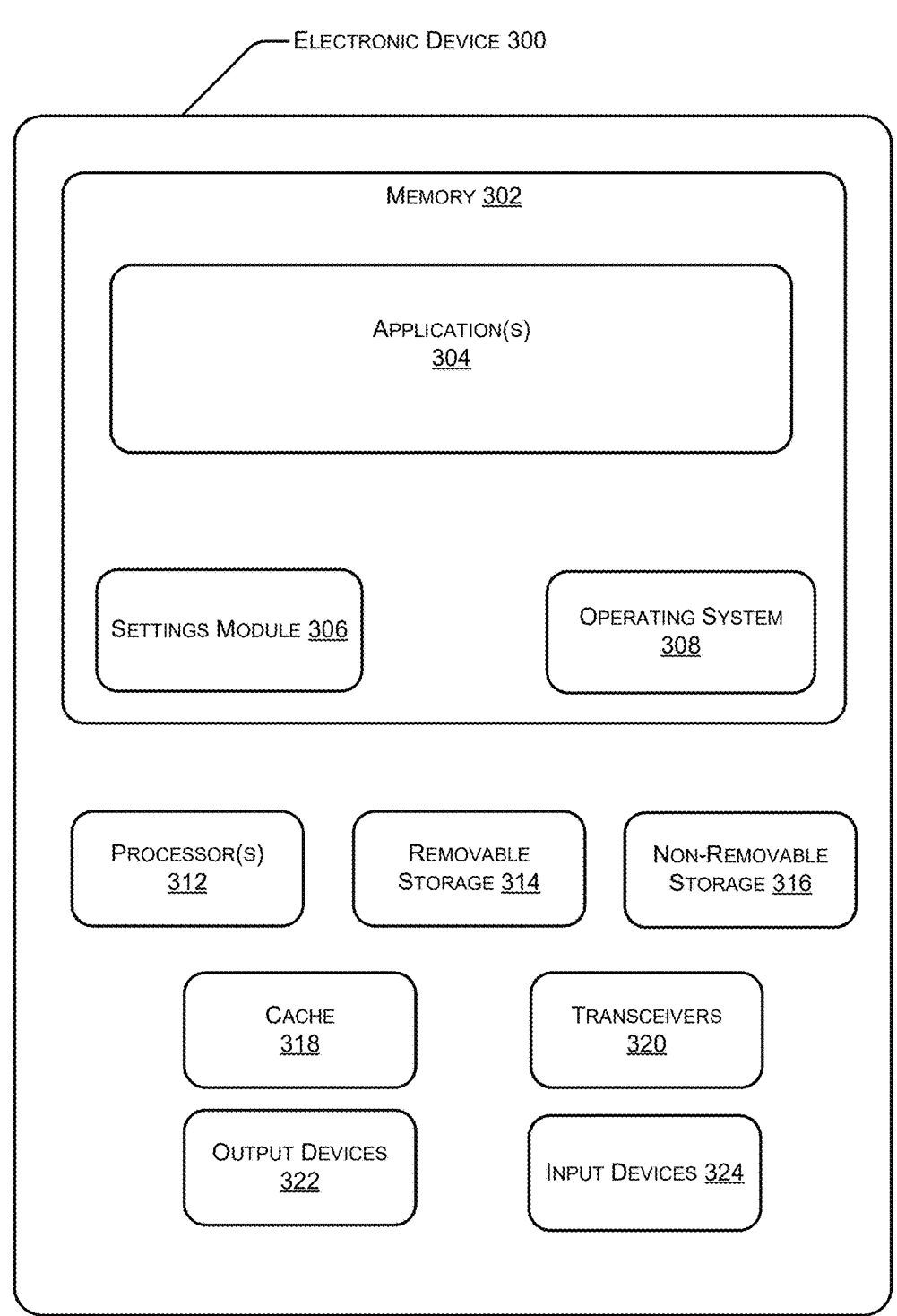
FIG. 3 schematically illustrates a component level view of an example electronic device configured for use with the techniques and architecture described herein, according to some implementations.

FIG. 3 schematically illustrates a component level view of a mobile device 300, such as portable electronic devices 102, configured to function within wireless communication networks. As illustrated, the mobile device 300 comprises a system memory 302, e.g., computer-readable media, storing application(s) 304, e.g., a call block/report application 326 that implements functions and UIs as described herein. Alternatively, the functions and UIs may be implemented, wholly or in part, via firmware (not illustrated). The mobile device also comprises a settings module 308, and an operating system 310. Also, the mobile device 300 includes processor(s) 312, a removable storage 314, a non-removable storage 316, cache 318, transceivers 320, output device(s) 322, and input device(s) 324. In various implementations, system memory 302 is volatile (such as RAM), non-volatile (such as ROM, flash memory, etc.) or some combination of the two. In some implementations, the processor(s) 312 is a central processing unit (CPU), a graphics processing unit (GPU), or both CPU and GPU, or any other sort of processing unit.

The mobile device 300 may also include additional data storage devices (removable and/or non-removable) such as, for example, magnetic disks, optical disks, or tape. Such additional data storage may include removable storage 314 and non-removable storage 316. Additionally, the mobile device 300 includes cache 318.

Non-transitory computer-readable media may include volatile and nonvolatile, removable and non-removable tangible, physical media implemented in technology for storage of information, such as computer readable instructions, data structures, program modules, or other data. System memory 302, removable storage 314, non-removable storage 316 and cache 318 are all examples of non-transitory computer-readable media. Non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other tangible, physical medium which can be used to store the desired information and which can be accessed by the mobile device 300. Any such non-transitory computer-readable media may be part of the mobile device 300. The processor(s) 312 may be configured to execute instructions, which may be stored in the non-transitory computer-readable media or in other computer-readable media accessible to the processor(s) 312.

In some implementations, the transceivers 320 include any sort of transceivers known in the art. For example, the transceivers 320 may include a radio transceiver that performs the function of transmitting and receiving radio frequency communications via an antenna (not shown). Also, or alternatively, the transceivers 320 may include wireless modem(s) to facilitate wireless connectivity with other computing devices. Further, the transceivers 320 may include wired communication components, such as an Ethernet port, for communicating with other networked devices.

In some implementations, the output devices 322 include any sort of output devices known in the art, such as a display (e.g., a liquid crystal display), speakers, a vibrating mechanism, or a tactile feedback mechanism. Output devices 322 also include ports for one or more peripheral devices, such as headphones, peripheral speakers, or a peripheral display.

In various implementations, input devices 324 include any sort of input devices known in the art. For example, input devices 324 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like. The input devices 324 may be used to enter preferences of a user of the mobile device 300 to define how the user wishes certain calls from third parties to be handled by the wireless communication network, as previously described herein.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. An automated method comprising:
determining, via a machine learning (ML) model, a list of virtual devices used for an automated testing arrangement for portable electronic devices, wherein the listed virtual devices correspond to registered portable electronic devices, and wherein the listed virtual devices each comprise a graphical user interface (GUI);
testing, via the automated testing arrangement, one or more first portable electronic devices, wherein the testing comprises the GUI of a particular listed virtual device interacting with a testing container that includes at least one physical portable electronic device corresponding to the particular listed virtual device;
during the testing, monitoring, via the ML model, the automated testing arrangement for the one or more portable electronic devices to obtain information;
comparing, via the ML model, the information with the list of virtual devices; and
based at least in part on the comparing, determining issues with virtual devices used for the automated testing arrangement.

2. The automated method of claim 1, wherein determining issues with virtual devices used for the automated testing arrangement comprises determining one or more virtual devices that are out of market.

3. The automated method of claim 2, further comprising:
providing, via the ML model, an alert to a user of the automated testing arrangement that one or more virtual devices that are out of market.

4. The automated method of claim 1, wherein determining issues with virtual devices used for the automated testing arrangement comprises determining one or more second portable electronic devices are designated for use in the automated testing arrangement.

5. The automated method of claim 1, wherein determining issues with virtual devices used for the automated testing arrangement comprises determining one or more of the one or more first portable electronic devices are not a registered portable electronic device.

6. The automated method of claim 1, further comprising:

determining, via the ML model, portable electronic devices available for including in the one or more first portable electronic devices.

7. The automated method of claim 1, further comprising:

determining, via the ML model, additional virtual devices available for inclusion on the list of virtual devices.

8. The automated method of claim 1, wherein the one or more first portable electronic devices comprise one of a smartphone, a tablet, or a laptop computer.

9. An automated testing arrangement for portable electronic devices, the automated testing arrangement comprising:

one or more processors; and one or more non-transitory media comprising instructions stored thereon, the instructions being executable by the one or more processors to cause the one or more processors to perform one or more actions comprising:

determining, via a machine learning (ML) model, a list of virtual devices used for the automated testing arrangement for portable electronic devices, wherein the listed virtual devices correspond to registered portable electronic devices, and wherein the listed virtual devices each comprise a graphical user interface (GUI);

testing, via the automated testing arrangement, one or more first portable electronic devices, wherein the testing comprises the GUI of a particular listed virtual device interacting with a testing container that includes at least one physical portable electronic device corresponding to the particular listed virtual device;

during the testing, monitoring, via the ML model, the automated testing arrangement for the one or more portable electronic devices to obtain information; and based at least in part on the comparing, determining issues with virtual devices used for the automated testing arrangement.

10. The automated testing arrangement of claim 9, wherein determining issues with virtual devices used for the automated testing arrangement comprises determining one or more virtual devices that are out of market.

11. The automated testing arrangement of claim 10, wherein the one or more actions further comprise:

providing, via the ML model, an alert to a user of the automated testing arrangement that one or more virtual devices that are out of market.

12. The automated testing arrangement of claim 9, wherein determining issues with virtual devices used for the automated testing arrangement comprises determining one or more second portable electronic devices are designated for use in the automated testing arrangement.

13. The automated testing arrangement of claim 9, wherein determining issues with virtual devices used for the automated testing arrangement comprises determining one or more of the one or more first portable electronic devices are not a registered portable electronic device.

14. The automated testing arrangement of claim 9, wherein the one or more actions further comprise:

determining, via the ML model, portable electronic devices available for including in the one or more first portable electronic devices.

15. The automated testing arrangement of claim 9, wherein the one or more actions further comprise:

determining, via the ML model, additional virtual devices available for inclusion on the list of virtual devices.

16. The automated testing arrangement of claim 9, wherein the one or more first portable electronic devices comprise one of a smartphone, a tablet, or a laptop computer.

17. One or more non-transitory computer-readable media storing computer-executable instructions that, when executed by one or more processors, cause the one or more processors to perform actions comprising:

determining, via a machine learning (ML) model, a list of virtual devices used for an automated testing arrangement for portable electronic devices, wherein the listed virtual devices correspond to registered portable electronic devices, and wherein the listed virtual devices each comprise a graphical user interface (GUI);

testing, via the automated testing arrangement, one or more first portable electronic devices, wherein the testing comprises the GUI of a particular listed virtual device interacting with a testing container that includes at least one physical portable electronic device corresponding to the particular listed virtual device;

during the testing, monitoring, via the ML model, the automated testing arrangement for the one or more portable electronic devices to obtain information;

comparing, via the ML model, the information with the list of virtual devices; and based at least in part on the comparing, determining issues with virtual devices used for the automated testing arrangement.

18. The one or more non-transitory computer-readable media of claim 17, wherein determining issues with virtual devices used for the automated testing arrangement comprises determining one or more virtual devices that are out of market, and wherein the actions further comprise:

providing, via the ML model, an alert to a user of the automated testing arrangement that one or more virtual devices that are out of market.

19. The one or more non-transitory computer-readable media of claim 17, wherein determining issues with virtual devices used for the automated testing arrangement comprises determining one or more second portable electronic devices are designated for use in the automated testing arrangement.

20. The one or more non-transitory computer-readable media of claim 17, wherein determining issues with virtual devices used for the automated testing arrangement comprises determining one or more of the one or more first portable electronic devices are not a registered portable electronic device.

* * * * *